Nov. 18, 1930  W. H. RIDGWAY  1,782,367
OVERFLOW VALVE FOR STEAM HYDRAULIC SYSTEMS
Original Filed June 1, 1923   2 Sheets-Sheet 2
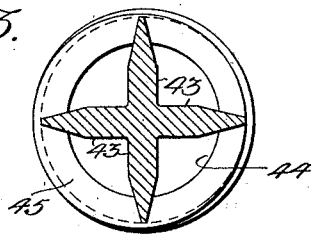
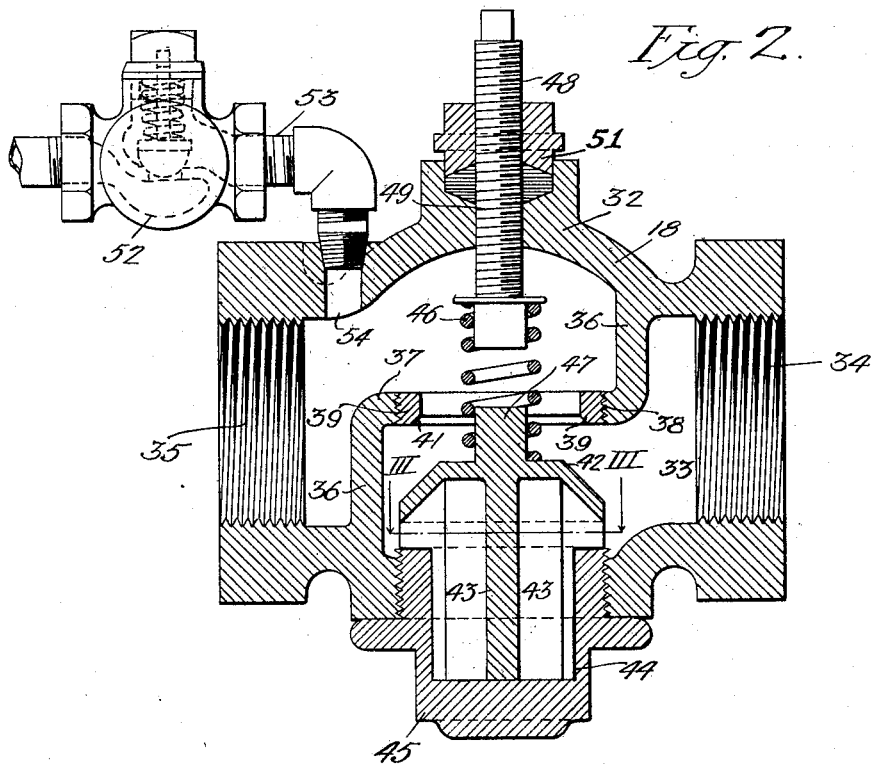
Inventor,
William H. Ridgway
by his Attorneys
Howson & Howson Patented Nov. 18, 1930

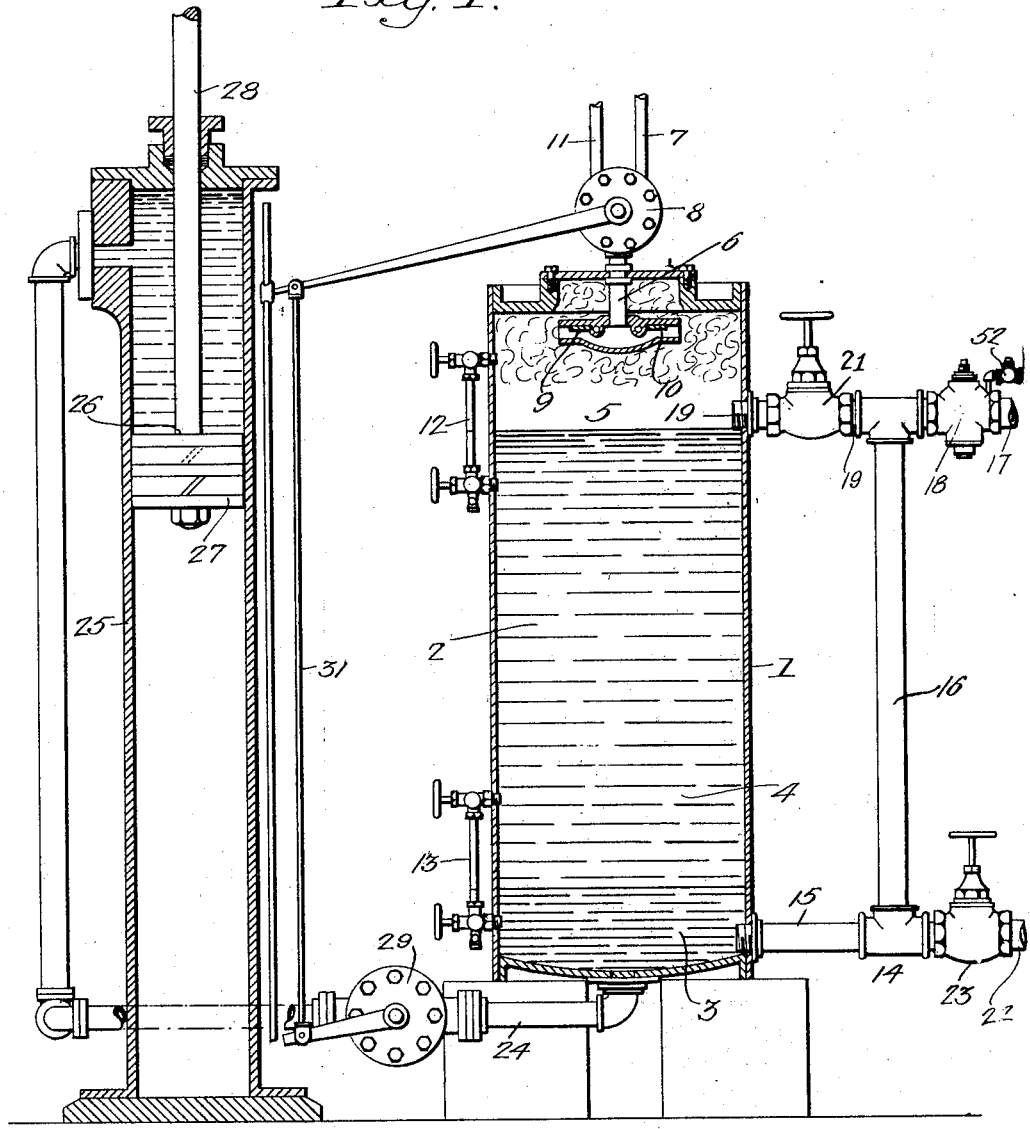

1,782,367

UNITED STATES PATENT OFFICE

WILLIAM H. RIDGWAY, OF COATESVILLE, PENNSYLVANIA, ASSIGNOR TO WILLIAM H. RIDGWAY AND ELLIS B. RIDGWAY, BOTH OF COATESVILLE, PENNSYLVANIA

OVERFLOW VALVE FOR STEAM HYDRAULIC SYSTEMS

Original application filed June 1, 1923, Serial No. 642,800. Divided and this application filed January 20, 1927. Serial No. 162,386.

My invention relates to pressure-actuated apparatus, having particular relation to hydraulic elevators.

In its broadest aspect, an important object of my invention is to provide apparatus of the class described, having highly desirable operating characteristics, wherein a pressure-actuated liquid column having suitable control means is operatively associated with the movable element of pressure-operated apparatus.

A more specific object of my invention is to provide in combination with an overflow-pipe for a pressure-actuated liquid column, a specially designed valve operable to close the overflow-pipe only when pressure is applied to the said liquid column, thereby providing for the removal of surplus liquid from the liquid column so long as no pressure is applied thereto.

With these and other objects and applications in mind, my invention further consists in the details of construction and operation and arrangement hereinafter set forth and claimed and illustrated in the accompanying drawing, wherein:

Fig. 1 is a side elevational view, partially in section, of apparatus embodying my invention;

Fig. 2 is an enlarged longitudinal sectional view of the valve construction shown in Fig. 1 for controlling the operation of the overflow-pipe; and Fig. 3 is a horizontal sectional view on the line III—III of Fig. 2.

In the illustrated form of embodiment of my invention shown in the drawing, I provide a vertically-positioned pressure cylinder 1 having a liquid column 2 contained therein comprising superposed layers 3 and 4 of water and oil, respectively, the quantity of the oil and water being such that when the liquid column 2 is at its maximum height, an air space 5 remains between the upper surface of the layer of oil and the upper end portion of the pressure cylinder 1.

Steam may be supplied to the air space 5 to exert a pressure on the liquid column 2 by means of a pipe 6 extending from the air space 5 to a steam-supply pipe 7 through a control valve 8 which is positioned on the outside of the pressure cylinder 1. The end of the pipe 6, opening into the air space 5, is provided with deflector plates 9 and 10 for preventing the steam from directly impinging upon the surface of the oil to decrease the losses by condensation. Inasmuch as steam is considerably lighter than air, the steam which is admitted to the air space 5 rises to the top thereof leaving an insulating stratum of air between the upper surface of the oil and the stratum of steam, whereby the tendency for contact between the oil and the steam, and the resulting steam condensation, is further decreased. The stratum of air and oil also serves to insulate the steam from the body of water 3.

The valve 8 is provided with an additional outlet opening for an exhaust pipe 11. Hence the valve 8 is operable to connect the pipe 6 directly to the steam pipe 7 or to the exhaust pipe 11. A pair of water-glass indicating devices 12 and 13, of well-known design, are positioned in operative relation to the upper and to the lower end portions of the pressure cylinder 1, whereby the upper levels of the oil and the water, respectively, may be determined.

An overflow-pipe 14 comprises a horizontally-extending portion 15 opening into the base portion of the pressure tank 1 containing the stratum of water 3, a vertically-extending portion 16 and a horizontally-extending portion 17 positioned at the desired upper level of the liquid column 2. A check valve 18, shown in detail in Fig. 2 and hereinafter more fully described, serves to close the overflow-pipe 14 only when steam is admitted to the air space 5, thereby providing during the periods of inoperation a leakage path, serving to limit the upper level of the liquid column 2. Such water as condenses on the upper surfaces of the body of oil 4 may be removed by means of a horizontal extension 19 of the pipe 17 which opens into the portion of the air space 5 just above the maximum upper level of the body of oil 4. A control valve 21 of any well-known design may be included in the pipe extension 19. The horizontally-extending portion 15 of the overflow-pipe 14 may be provided with an extension 22 having a similar control valve 23, whereby the water and oil, constituting the column 2 may be removed at will from the pressure cylinder 1.

The cylinder 1 has an outlet opening in the base portion thereof communicating by means of a pipe 24 with a cylinder 25 of pressure operated apparatus 26 comprising in addition a piston 27 movable in said cylinder when steam is supplied to said air space 5. A connecting rod 28 may operatively associate the piston 27 with elevator apparatus (not shown). A control valve 29 is included in the communicating pipe 24 and it is adapted, in one position, to provide for the passage of the liquid medium constituting the liquid column 2 from the pressure cylinder 1 to the cylinder 25 of the pressure-actuated apparatus 26 and in its opposite position to provide for the return of the liquid medium, preventing, however, at all times, any backflow in either of its operative positions. Inasmuch as a valve having the characteristics just defined is of standard construction, a detail description thereof has been omitted. In some cases, it may be desirable to interconnect the actuating elements of the control valves 8 and 29, respectively, by common adjusting means 31 to effect the simultaneous operation of the same, the control valve 29 being opened to provide for the passage of the liquid medium therethrough from the cylinder 1 to the pressure apparatus 26 simultaneous with the opening of the valve 8 to admit steam to the air space 5.

Referring more especially to the valve construction 18, which is shown in longitudinal section in Fig. 2, a valve casing 32 is provided having a main passageway 33 terminating in inlet and outlet openings 34 and 35, respectively, and intersected by a transversely-extending partition 36 having a horizontally-extending portion 37 provided with a threaded perforation 38. An annular member 39 is secured in threaded engagement with the threaded perforation 38 and beveled at the lower edge thereof to form a valve seat 41 for a cooperating valve disk 42 having depending wing portions 43 slidably engaging the walls of a pocket 44 formed in a hollow cap member 45 which is secured in threaded engagement with the portion of the valve casing 32 directly beneath the valve seat 41.

Force may be exerted on the movable valve element to resiliently maintain the valve disk 42 in spaced relation to the valve seat 41 by means of a coiled spring 46 having its lower end embracing an integral extension 47 of the valve disk 42 and its upper end embracing an adjustable screw element 48 secured in threaded engagement with a perforation 49 in the valve casing 32. The upper portion of the screw element 48 may extend from the valve casing 32 through a stuffing-box construction 51 of usual design, which is carried by the valve casing 32.

In operation, the force of the spring 46 is such that the valve disk 42 is actuated into engagement with the valve seat 41 to close the valve passageway 33 only when a fluid medium, under such pressure as obtains when steam is admitted to the air space 5, is forced through the valve inlet opening 34. The valve construction just defined, therefore, provides for the continuous passage of the liquid medium therethrough when it is actuated by a pressure less than the force of the spring 46, as obtains during normal overflow conditions.

A check valve 52, of usual construction communicating with the atmosphere, may be operatively associated by means of a communicating pipe 53 with a perforation 54 in the valve casing 32 terminating in the portion of the main passageway 33 immediately adjacent to the outlet opening 35 thereof, whereby such vacuum as is formed therein during the normal operation of the valve may be relieved.

In the operation of my invention, when the valve-actuating means 31 is moved downwardly, as shown in Fig. 1, steam is admitted to the air space simultaneously with the opening of the communicating pipe 24 to provide for a movement of the liquid medium therethrough from the cylinder 1. The action of the steam is to exert a pressure on the liquid column 2 which is transmitted to the piston 27 of the pressure-operated apparatus 26, causing a downward movement of the same and the consequent operation of such elevator apparatus (not shown) as is associated therewith through the connecting rod 28. When force is applied to the liquid column 2, the valve 18 closes in the manner hereinbefore described, to close the overflow-pipe 14.

When the valve-actuating means 31 is moved upwardly to connect the exhaust pipe 11 with the air space 5, the pressure upon the liquid column 2 is removed simultaneous with the actuation of the valve 29 to the other of its operative positions providing for the return of the liquid medium from the pressure-actuated apparatus 26 to the cylinder 1. Simultaneous with the removal of the pressure on the liquid column 2, the spring 46 actuates the valve disk 42 out of engagement with the valve seat 41, opening the valve 18 and thereby rendering the overflow-pipe 14 effective, as shown in Fig. 2. The level of the liquid column 2 in the cylinder 1 continues to rise until it has reached its maximum upper level, as determined by the position of the horizontally-extending portion 17 of the overflow-pipe 14.

Reference is made to my co-pending application, Serial No. 642,800, filed June 1, 1923, Patent No. 1,626,556 dated April 26, 1927, and assigned to William H. and Ellis B. Ridgway, wherein the valve construction comprising the subject matter of the present application is claimed broadly in combination with hydraulic elevator mechanism.

While I have shown only one embodiment of my invention, for the purpose of describing the same and illustrating its principles of construction and of operation, it is apparent that various changes and modifications may be made therein without departing from the spirit and scope of my invention. I desire, therefore, that only such limitations shall be imposed thereon, as are indicated in the appended claims or as are demanded by the prior art.

I claim:

1. A valve comprising a valve casing having a passageway terminating in inlet and outlet openings, a partition having an opening therein intercepting said passageway, said partition being formed to constitute a valve seat, the portion of said casing beneath said opening being provided with a pocket, a valve element having one end slidably mounted in said pocket and the other end provided with a valve disk normally spaced from said valve seat, means for resiliently maintaining said valve disk in said last-mentioned position, the valve element being actuated to cause said valve disk to engage said valve seat only when the pressure of a fluid medium supplied to said valve inlet opening exceeds a predetermined value, and a check valve communicating with the atmosphere and having an operative connection with said casing immediately adjacent to said outlet opening for avoiding vacuum effects on the operation of said movable valve element.

2. A valve casing having a partition in the passageway thereof provided with a valve seat, a spring loaded valve disk movable into engagement with said valve seat upon the application of a predetermined force to said spring loaded valve, and a check valve communicating with the atmosphere and so connected to said valve casing as to tend to prevent vacuum effects on the operation of said spring loaded valve.

WILLIAM H. RIDGWAY.